United States Patent [19]
Sylvester

[11] 3,905,619
[45] Sept. 16, 1975

[54] HITCH DEVICE

[76] Inventor: Merton E. Sylvester, Rt. No. 1, Sabetha, Kans. 66534

[22] Filed: Oct. 29, 1974

[21] Appl. No.: 517,389

[52] U.S. Cl............ 280/415 A; 280/461 A; 280/494
[51] Int. Cl.².............................................. B60D 1/14
[58] Field of Search........... 280/415, 460, 461, 492, 280/494, 499

[56] References Cited
UNITED STATES PATENTS

| | | | |
|---|---|---|---|
| 2,780,479 | 2/1957 | Frieberg.......................... | 280/499 X |
| 3,031,208 | 4/1962 | Abbott......................... | 280/461 A X |
| 3,241,862 | 3/1966 | Bunting.......................... | 280/494 X |
| 3,489,430 | 1/1970 | Schnittjer..................... | 280/415 R X |

Primary Examiner—Leo Friaglia
Attorney, Agent, or Firm—Fishburn, Gold & Litman

[57] ABSTRACT

A hitch device for a prime mover, such as an agricultural tractor or the like, having a pair of laterally spaced rearwardly extending hitch bars each rotatably receiving a respective end of a draft bar having an intermediate portion thereof pivotally mounted between first and second arms of one end of a rod having the other end thereof rotatably mounted on a frame having a trailing end thereof adapted to be mounted on a towed mobile frame, such as an agricultural implement. The hitch device includes members mounted on the prime mover for supporting the hitch bars of the prime mover in a selected position relative to the towed mobile frame.

12 Claims, 7 Drawing Figures

Fig. 1.

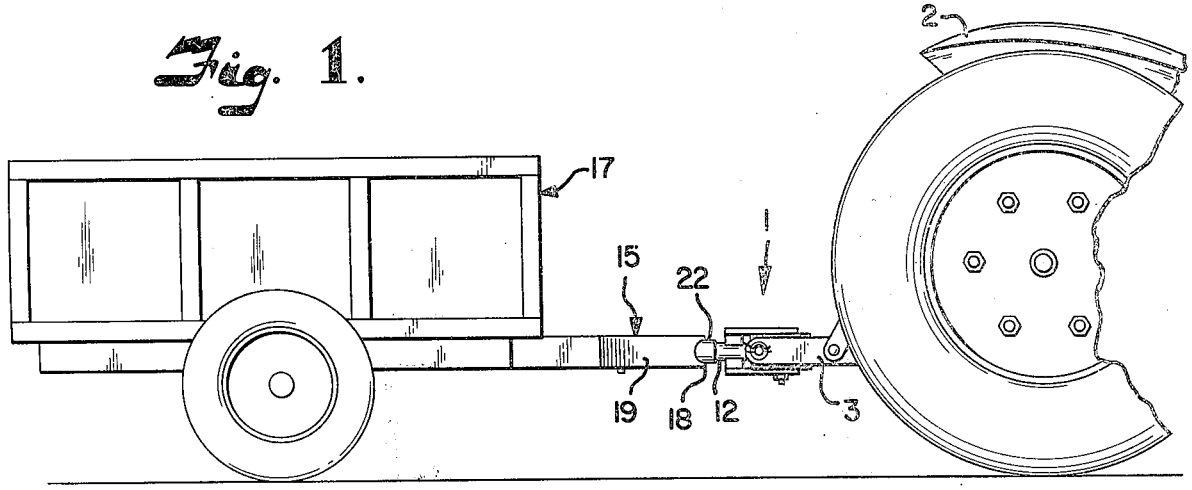
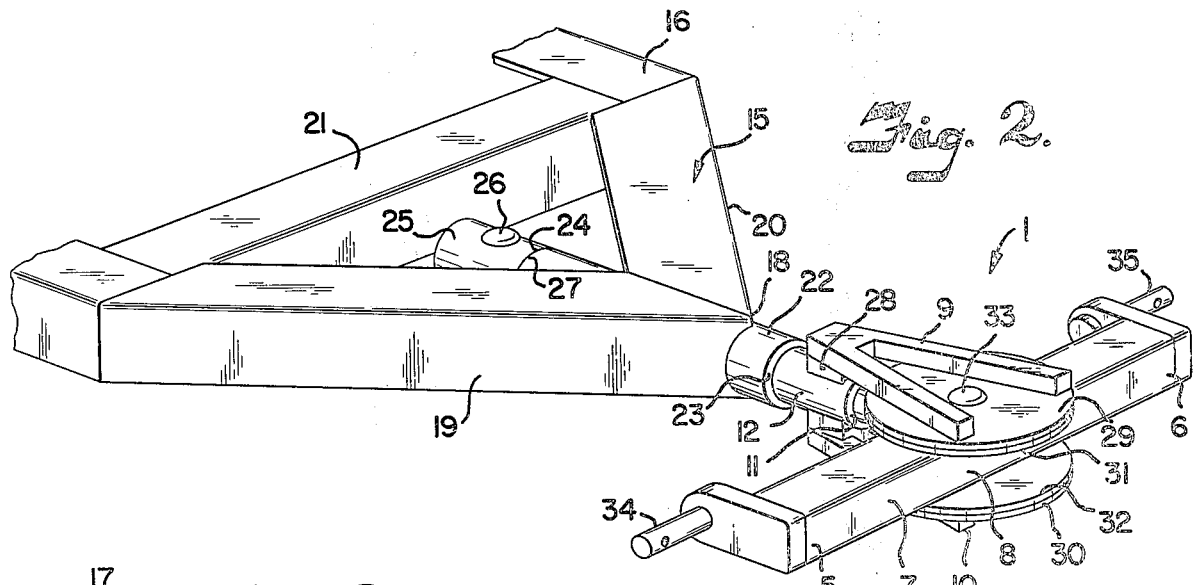
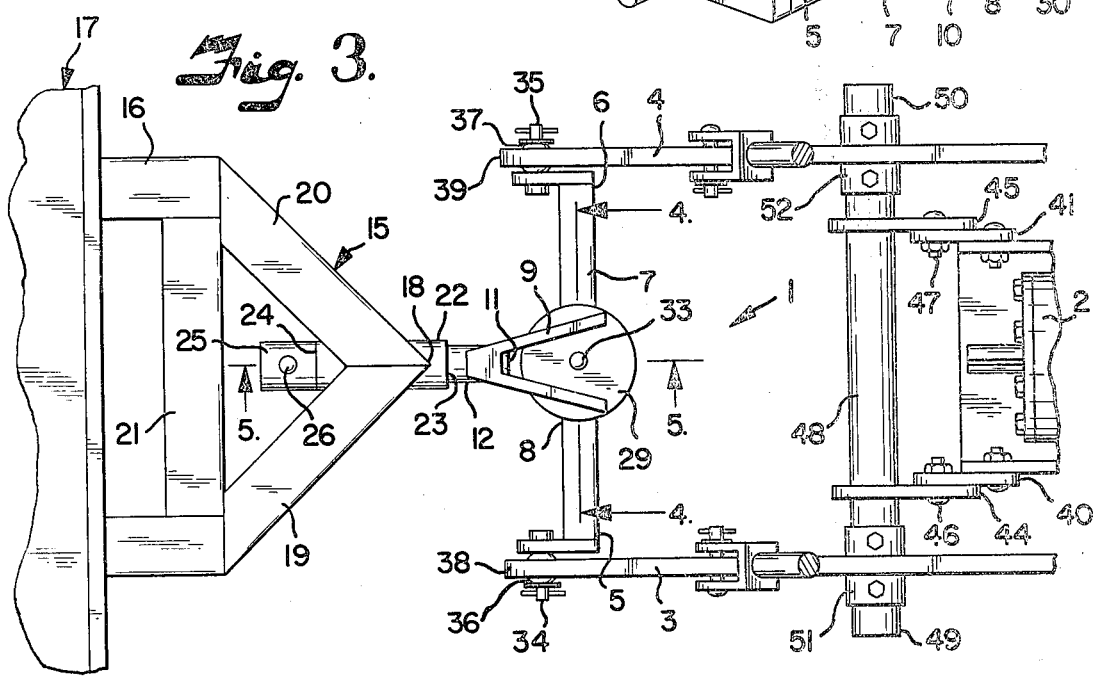

HITCH DEVICE

The present invention relates to hitch devices and more particularly to a hitch device for a prime mover having a pair of laterally spaced rearwardly extending hitch bars and adapted to permit substantially universal movement of a towed mobile frame relative to the prime mover.

The principal objects of the present invention are: to provide a hitch device particularly adapted for use with an agricultural tractor having a pair of rearwardly extending hitch bars and adapted for substantially universal movement of a towed mobile frame relative to the prime mover; to provide such a hitch device adapted to permit relative movement between a prime mover and a towed or trailing implement; to provide such a hitch device adapted to compensate for uneven terrain whereby the prime mover and the trailing implement may both be in a stable position relative to respective surfaces of the terrain; to provide such a hitch device adapted to be mounted on any towed vehicle; to provide such a hitch device adapted to support the hitch bars of the prime mover in a selected location relative to the trailing implement; to provide such a hitch device providing improved control of and movement of the trailing implement; and to provide such a hitch device which is economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the hitch device.

FIG. 1 is a side elevational view of an agricultural implement connected to a prime mover by a hitch device embodying features of the present invention.

FIG. 2 is an enlarged perspective view of the hitch device.

FIG. 3 is an enlarged top plan view of the hitch device.

Figure 4:
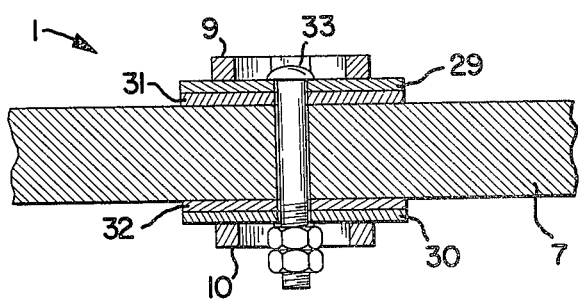
FIG. 4 is an enlarged fragmentary transverse sectional view taken on line 4—4, FIG. 3.
Figure 5:
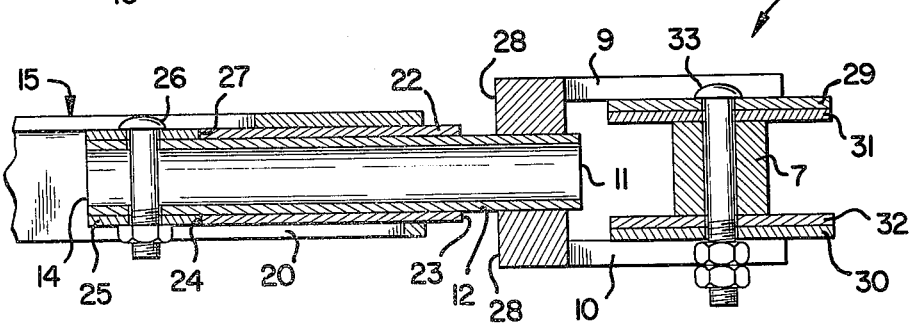
FIG. 5 is an enlarged fragmentary longitudinal sectional view taken on line 5—5, FIG. 3.
Figure 6:
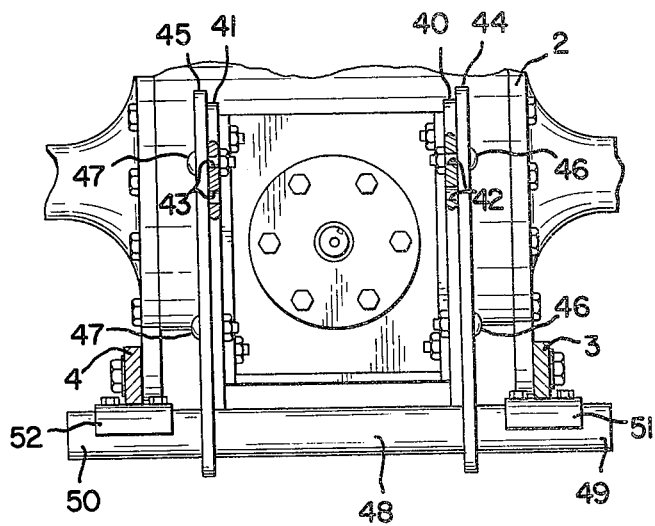
FIG. 6 is an enlarged fragmentary rear elevational view of the prime mover and showing a support for hitch bars of the prime mover.
Figure 7:
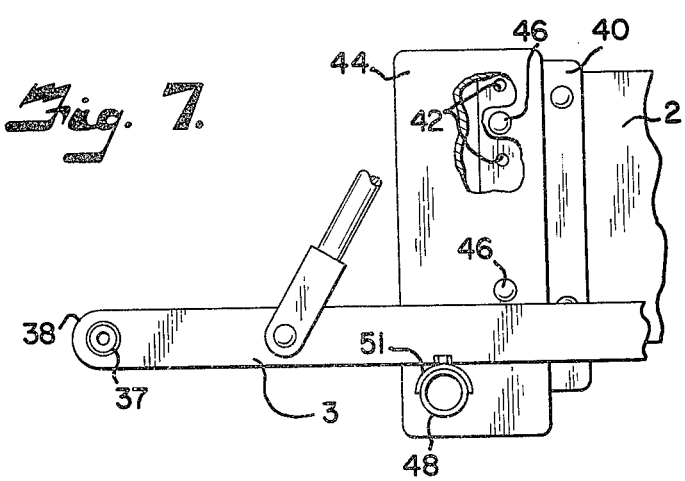
FIG. 7 is an enlarged fragmentary side elevational view of the support for the hitch bars of the prime mover.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a hitch device for a prime mover 2, such as an agricultural tractor or the like, having a pair of laterally spaced rearwardly extending hitch bars 3 and 4 rotatably receiving opposite ends 5 and 6 respectively of a draft bar 7 having an intermediate portion 8 thereof pivotally mounted between first and second arms 9 and 10 of one end 11 of a tongue member or rod 12 having the other end 14 thereof rotatably mounted on frame 15 having a trailing end 16 thereof adapted to be mounted on a towed mobile frame 17, such as an agricultural implement. The hitch device 1 includes members, as later described, mounted on the prime mover 2 for supporting the hitch ars 3 and 4 of the prime mover 2 in a selected position relative to the towed mobile frame 17.

The frame 15 provides means on the towed mobile frame 17 for rotatably mounting the tongue member 12 and the illustrated frame 15 has a leading end 18 positioned adjacent the prime mover 2 and has the trailing end 16 thereof adapted to be suitably mounted on the towed mobile frame 17. The frame 15 has side members 19 and 20 diverging rearwardly and outwardly from the leading end 18 toward the trailing end 16. An end member 21 extends between trailing ends of the side members 19 and 20 to form a rigid generally triangular structure.

A tubular member 22 is mounted between leading ends of the side members 19 and 20 and is positioned substantially normal or perpendicular to the end member 21. The tubular member 22 is thereby substantially parallel with the path of travel of the towed mobile frame 17. The tubular member 22 may be any desired shape in cross section, however, the tubular member 22 is preferably round in cross section to permit the rod 12 to rotate therein. The tubular member 22 has a leading end 23 and a trailing end 24 to define respective shoulders or abutments, for a purpose later described.

The rod 12 may be mounted in bearings in the tubular member 22, however, the rod 12 preferably has a cross sectional shape corresponding to the shape of the tubular member 22 and is illustrated as being round in cross section to be rotatably received in the tubular member 22. The rod 12 has the one end 11 thereof extending forwardly from the leading end 18 of the frame 15. The rod 12 has a portion thereof extending beyond the trailing end 24 of the tubular member 22 and has a cap or sleeve 25 mounted on the other end 14 of the rod 12 to prevent the rod from being removed from the tubular member 22. The cap or sleeve 25 is retained in position on the rod 12 by a suitable fastener, such as a bolt 26 extending through the rod 12 and cap sleeve 25, whereby a forward pull on the rod 12 moves an end 27 of the cap 25 into engagement with the trailing end 24 of the tubular member 22.

The one end 11 of the tongue member or rod 12 has a mounting portion 28 extending substantially normal or perpendicular to the rod 12. The mounting portion 28 is engageable with the leading end 23 of the tubular member 22 thereby maintaining a selected separation between the prime mover 2 and the towed mobile frame 17. The spacing between the cap or sleeve 25 and the mounting portion 28 is greater than the length of the tubular member 22 whereby the tongue member 12 is movable longitudinally therein.

The first and second arms 9 and 10 extend longitudinally from the mounting portion 28 and are positioned in facing relation. The first and second arms 9 and 10 of the rod 12 may be any desired shape, however, the arms 9 and 10 are illustrated as bifurcated, for a purpose later described. The first and second arms 9 and 10 have planar members 29 and 30 respectively mounted thereon and positioned in facing relation. The planar members 29 and 30 are generally circular in plan.

The draft bar 7 may be any desired shape in cross section, however, the draft bar 7 is illustrated as a generally planar member having the intermediate portion 8 thereof positioned between the first and second arms 9 and 10 and the planar members 29 and 30 mounted thereon. The intermediate portion 8 of the draft bar 7 has a planar or flat sides engageable with the planar members 29 and 30 and the sides are illustrated as planar members 31 and 32 positioned in sliding engagement with the planar members 29 and 30 respectively of the first and second arms 9 and 10.

A pivot pin 33, in the form of a bolt, extends through the planar members 29, 30, 31, and 32 and through the intermediate portion 8 of the draft bar 7. The pivot pin 33 also extends between the bifurated portions of the first and second arms 9 and 10. The pivot pin 33 is preferably positioned to intersect the longitudinal axis of draft bar 7 and the longitudinal axis of the tongue member 12.

The opposite ends 5 and 6 of the draft bar 7 are adapted to be rotatably mounted on the hitch bars 3 and 4 respectively of the prime mover 2. In the illustrated structure, pins 34 and 35 are received in bearings 36 and 37 in rear end portions 38 and 39 of the hitch bars 3 and 4 respectively. In the illustrated structure, the pins 34 and 35 extend through the bearings 36 and 37 and have suitable fastening devices, such as bolts, cotter pins, or the like therein, to retain the draft bar 7 in the hitch bars 3 and 4.

The draft bar 7 has a longitudinal axis positioned substantially transverse to the path of travel of the prime mover 2. The pin 34 and 35 are aligned on an axis parallel with the longitudinal axis of the draft bar and spaced rearwardly of the trailing side of the draft bar 7. The axis of the pins 34 and 35 is preferably positioned between the longitudinal axis of the draft bar 7 and the mounting portion 28 of the tongue member 12.

The bearings 36 and 37 are aligned and adapted to permit limited relative angular movement between the towed mobile frame 17 and the prime mover 2. The pins 34 and 35 are rotatably received in the bearings 36 and 37 respectively and thereby permit large relative movement between the prime mover 2 and the towed mobile frame 17.

The hitch device 1 includes hitch bar support means mounted on the prime mover 2 for supporting the hitch bars 3 and 4 of the prime mover 2 in a selected position relative to the towed mobile frame 17. The illustrated hitch bar support means includes laterally spaced mounting members 40 and 41 suitably secured to the prime mover 2, as by bolts, welding, or the like. The mounting members 40 and 41 each have a rearwardly extending portion having a plurality of vertically spaced apertures 42 and 43 respectively therein.

Hanger members 44 and 45 are adjustably mounted on the mounting members 40 and 41 respectively, as by a plurality of bolts 46 and 47. A support bar 48 is mounted on and extends between the hanger members 44 and 45. The illustrated support bar 48 has laterally extending end portions 49 and 50 extending beyond the hanger members 44 and 45 respectively. The end portions 49 and 50 have suitable wear or bearing plates 51 and 52 respectively thereon to provide support for the hitch bars 3 and 4 respectively which extend longitudinally rearwardly from the prime mover 2.

In using a hitch device as illustrated and described, the pins 34 and 35 of the draft bar 7 are mounted in the bearings 36 and 37 in the rear end portions 38 and 39 of the hitch bars 3 and 4 respectively. The pins 34 and 35 are retained in the bearings 36 and 37 by suitable fasteners. The hanger members 44 and 45 are adjusted vertically of the mounting members 40 and 41, as desired, to position the longitudinally extending portions of the hitch bars 3 and 4 of the prime mover 2 in a desired alignment and position relative to the center of gravity and the longitudinal axis of the towed mobile frame 17 and then the bolts 46 and 47 are tightened to retain said adjustment. The trailing end 16 of the frame 15 is suitably mounted on the towed mobile frame 17. The prime mover 2 is then positioned relative to the towed mobile frame 17 and the rod 12 is positioned in the tubular member 22 and the cap 25 is secured in place by the bolt 26 so that the end 27 of the cap 25 is in facing relation with the trailing end 24 of the tubular member 22. The rod 12 is adjusted in the tubular member 22 so that the pivot pin 33 may be inserted through the draft bar 7 and the planar members 29 to 32 inclusive.

The rod 12 is rotatably received in the tubular member 22 and the intermediate portion 8 of the draft bar 7 is pivotally mounted on the one end 11 of the rod 12. The pins 34 and 35 are rotatably received in the bearings 36 and 37 in the rear end portions 38 and 39 of the hitch bars 3 and 4 respectively whereby the hitch device 1 provides substantially greater universal movement than prior hitch devices.

It is to be understood that while I have illustrated and described one form of my invention it is not to be limited to the specific form of arrangement of parts herein described and shown.

What I claim and desire to secure by Letters Patent is:

1. A hitch device for use between a prime mover and a towed vehicle and comprising:

a. a draft bar adapted to have opposite ends thereof rotatably mounted on respective hitch bars of a prime mover, said draft bar extending substantially transverse to the path of travel of the prime mover, said draft bar having a longitudinal axis and a leading side and a trailing side, said draft bar having a pin for each of the opposite ends thereof and each extending longitudinally from the respective opposite end of said draft bar, and pins being aligned on an axis substantially parallel with the longitudinal axis of said draft bar and spaced rearwardly of the trailing side of said draft bar;

b. a tongue member having one end thereof pivotally mounted on said draft bar intermediate the opposite ends of said draft bar; and c. means positioned rearwardly of said draft bar and adapted to be mounted on a towed mobile frame for rotatably mounting said tongue member in a position substantially parallel with the path of travel of the towed mobile frame.

2. A hitch device for use between a prime mover and a towed vehicle and comprising:

a. a draft bar adapted to have opposite ends thereof rotatably mounted on respective hitch bars of a prime mover, said bar extending substantially transverse to the path of travel of the prime mover;

b. a tongue member having one end thereof pivotally mounted on said draft bar intermediate the opposite ends of said draft bar; and c. means positioned rearwardly of said draft bar and adapted to be mounted on a towed mobile frame for rotatably mounting said tongue menber in a position substantially parallel with the path of travel of the towed mobile frame, said means for rotatably mounting said tongue member including a frame having a tubular member extending substantially parallel with the path of travel of the towed mobile frame, said tubular member having a leading end and a trailing end, said tongue member having means mounted thereon and adjacent each of the ends thereof for permitting longitudinal movement of said tongue member relative to said tubular member.

3. A hitch device as set forth in claim 2 wherein:

a. said draft bar has a longitudinal axis and a leading side and a trailing side;

b. said draft bar has a pin for each of the opposite ends thereof and each extending longitudinally from the respective opposite end of said draft bar; and c. said pins are aligned on an axis substantially parallel with the longitudinal axis of said draft bar and positioned between the trailing side of said draft bar and the leading end of said tubular member.

4. In combination:

a. a frame having a leading end and a trailing end adapted to be mounted on a leading end of a towed mobile frame;

b. a tubular member mounted on said frame and extending substantially normal to the trailing end of said frame;

c. a rod rotatably mounted in said tubular member and having one end portion thereof extending forwardly from the leading end of said frame, said rod having means thereon for retaining same in said tubular member, the one end portion of said rod having first and second laterally spaced arms;

d. a draft bar having an intermediate portion thereof pivotally mounted on the one end portion of said rod, said draft bar having opposite end portions thereof spaced from said rod, said intermediate portion of said draft bar being positioned between said first and second arms of said rod, said intermediate portion of said draft bar and said first and second arms of said rod having respective facing and engaging surfaces; and e. a prime mover having a pair of laterally spaced longitudinally extending hitch bars each having means in a rear end portion thereof for rotatably receiving a respective one of the opposite end portions of said draft bar.

5.

a. a frame having a leading end and a trailing end adapted to be mounted on a leading end of a towed mobile frame;

b. a tubular member mounted on said frame and extending substantially normal to the trailing end of said frame;

c. a rod rotatably mounted in said tubular member and having one end portion thereof extending forwardly from the leading end of said frame, said rod having means thereon for retaining same in said tubular member;

d. a draft bar having an intermediate portion thereof pivotally mounted on the one end portion of said rod, said draft bar having opposite end portions thereof spaced from said rod;

e. a prime mover having a pair of laterally spaced longitudinally extending hitch bars each having means in a rear end portion thereof for rotatably receiving a respective one of the opposite end portions of said draft bar; and f. means mounted on said prime mover for supporting said hitch bars of said prime mover in a selected position relative to the towed mobile frame.

6. A combination as set forth in claim 5 wherein said means for supporting said hitch bars includes:

a. laterally spaced mounting members secured to said prime mover and each having a portion thereof extending rearwardly from said prime mover;

b. a hanger member for each of said mounting members, each of said hanger members being adjustably mounted on the respective mounting member; and c. a support bar mounted on and extending between said hanger members, said support bar having portions thereof positioned to have said hitch bars of said prime mover in support engagement therewith.

7. In combination:

a. a frame having a leading end and a trailing end adapted to be mounted on a leading end of a towed mobile frame;

b. a tubular member mounted on said frame and extending substantially normal to the trailing end of said frame;

c. a rod rotatably mounted in said tubular member and having one end portion thereof extending forwardly from the leading end of said frame, said rod having means thereon for retaining same in said tubular member, the one end portion of said rod having first and second laterally spaced arms;

d. a draft bar having an intermediate portion thereof pivotally mounted on the one end portion of said rod, said draft bar having opposite end portions thereof spaced from said rod, said intermediate portion of said draft bar positioned between said first and second arms of said rod, said intermediate portion of said draft bar having opposite generally planar sides;

e. facing generally planar members mounted on said first and second arms of said rod and each in sliding engagement with a respective one of said planar sides of said draft bar;

f. a pivot pin extending through said planar members of said first and second arms of said rod and through said intermediate portion of said draft bar; and g. a prime mover having a pair of laterally spaced longitudinally extending hitch bars each having means in a rear end portion thereof for rotatably receiving a respective one of the opposite end portions of said draft bar.

8. A hitch device for use between a prime mover and a towed vehicle and comprising:

a. a frame having a leading end and a trailing end adapted to be mounted on a leading end of a towed mobile frame;
b. a tubular member mounted on said frame and extending substantially normal to the trailing end of said frame;
c. a rod rotatably mounted in said tubular member and having one end portion thereof extending forwardly from the leading end of said frame, said rod having means thereon for retaining same in said tubular member, the one end portion of said rod having first and second laterally spaced arms;
d. a draft bar having an intermediate portion thereof pivotally mounted on the one end portion of said rod, said draft bar having opposite ends thereof spaced from said rod, said intermediate portion of said draft bar being positioned between said first and second arms of said rod, said intermediate portion of said draft bar and said first and second arms of said rod having respective facing and engaging surfaces; and
e. means on each of the opposite ends of said draft bar for being rotatably mounted on respective hitch bars of a prime mover.

9. A hitch device for use between a prime mover and a towed vehicle and comprising:
a. a frame having a leading end and a trailing end adapted to be mounted on a leading end of a towed mobile frame;
b. a tubular member mounted on said frame and extending substantially normal to the trailing end of said frame;
c. a rod rotatably mounted in said tubular member and having one end portion thereof extending forwardly from the leading end of said frame, said rod having means thereon for retaining same in said tubular member;
d. a draft bar having an intermediate portion thereof pivotally mounted on the one end portion of said rod, said draft bar having opposite ends there of spaced from said rod;
e. means on each of the opposite ends of said draft bar for being rotatably mounted on respective hitch bars of a prime mover; and
f. means mounted on the prime mover for supporting the hitch bars of the prime mover in a selected position relative to the towed mobile frame.

10. A hitch device as set forth in claim 9 wherein said means for supporting the hitch bars of the prime mover includes:
a. laterally spaced mounting members secured to the prime mover and each having a portion thereof extending rearwardly from the prime mover;
b. a hanger member for each of said mounting members and each being adjustably mounted on the respective mounting member; and
c. a support bar mounted on and extending between said hanger members, said support bar having portions thereof positioned to have the hitch bars of the prime mover in supported engagement therewith.

11. A hitch device as set forth in claim 9 wherein:
a. said draft bar has a longitudinal axis and a leading side and a trailing side;
b. said draft bar has a pin for each of the opposite ends thereof and each extending longitudinally from the respective opposite end of said draft bar; and
c. said pins are aligned on an axis substantially parallel with the longitudinal axis of said draft bar and spaced rearwardly of the trailing side of said draft bar.

12. A hitch device for use between a prime mover and a towed vehicle and comprising:
a. a frame having a leading end and a trailing end adapted to be mounted on a leading end of a towed mobile frame;
b. a tubular member mounted on said frame and extending substantially normal to the trailing end of said frame;
c. a rod rotatably mounted in said tubular member and having one end portion thereof extending forwardly from the leading end of said frame, said rod having means thereon for retaining same in said tubular member, the one end portion of said rod having first and second laterally spaced arms, said first and second arms of said rod having facing generally planar members;
d. a draft bar having an intermediate portion thereof pivotally mounted on the one end portion of said rod, said draft bar having opposite ends thereof spaced from said bar, said intermediate portion of said draft bar being positioned between said planar members of said first and second arms of said rod, said intermediate portion of said draft bar having opposite generally planar sides each in sliding engagement with a respective one of said planar members of said first and second arms of said rod, the pivotal mounting of the intermediate portion of said draft bar on the one end of said rod includes a pivot pin extending through said planar members of said first and second arms of said rod and through said intermediate portion of said draft bar; and
e. means on each of the opposite ends of said draft bar for being rotatably mounted on respective hitch bars of a prime mover.

* * * * *